United States Patent [19]

Rhode

[11] Patent Number: 5,423,559
[45] Date of Patent: Jun. 13, 1995

[54] SNOW CYCLE

[76] Inventor: Randall E. Rhode, W7149 N. Shore Dr., Portage, Wis. 53901

[21] Appl. No.: 46,460

[22] Filed: Apr. 13, 1993

[51] Int. Cl.⁶ .......................... B62B 15/00; B62B 19/00
[52] U.S. Cl. ...................................... 280/12.14; 305/13
[58] Field of Search .................. 280/7.14, 8, 10, 12.1, 280/12.13, 12.14; 180/184, 185, 196, 9.25, 9.3, 9.64; 305/11, 13, 15, 19

[56] References Cited

U.S. PATENT DOCUMENTS

| | | | |
|---|---|---|---|
| 526,210 | 9/1894 | Young | 280/12.14 X |
| 526,556 | 9/1894 | Bolton | 280/12.1 |
| 554,272 | 2/1896 | Hochhaus | 305/13 |
| 654,291 | 7/1900 | Stith . | |
| 1,068,883 | 7/1913 | Frank . | |
| 1,221,898 | 4/1917 | Palm | 280/7.14 |
| 1,318,166 | 10/1919 | Matheus | 280/12.1 |
| 2,074,389 | 3/1937 | Grant | 180/185 X |
| 3,250,577 | 5/1966 | Olson | 305/13 |
| 3,412,820 | 11/1968 | Wachholz . | |
| 3,412,821 | 11/1968 | Humphrey . | |
| 3,885,641 | 5/1975 | Harris . | |
| 4,534,437 | 8/1985 | Howerton . | |
| 5,102,153 | 4/1992 | Rhode . | |

FOREIGN PATENT DOCUMENTS

| | | | |
|---|---|---|---|
| 458162 | 7/1949 | Canada . | |
| 2556303 | 6/1985 | France . | |
| 0185886 | 7/1990 | Japan | 180/185 |
| 0185887 | 7/1990 | Japan | 280/12.13 |

Primary Examiner—Brian L. Johnson
Attorney, Agent, or Firm—Foley & Lardner

[57] ABSTRACT

A snow cycle including a frame, a ski assembly mounted on the front of the frame and a handle operatively connected to the ski assembly, a wheel mounted for rotary motion on the back of the frame, a number of drive blocks mounted around the perimeter of the wheel, an idler roller assembly mounted on the frame in a spaced relation to the wheel, a drive belt wrapped around the drive wheel and the idler roller assembly, the belt having a plurality of drive plugs mounted in a spaced relation to engage the drive blocks on the wheel and a pedal assembly mounted on the frame and operatively connected to rotate the wheel to drive the belt.

1 Claim, 3 Drawing Sheets

SNOW CYCLE

FIELD OF THE INVENTION

The present invention relates generally to a snow cycle for travelling on snow and more particularly to a self-propelled snow cycle.

BACKGROUND OF THE INVENTION

The present invention is a modification of my earlier U.S. Pat. No. 5,102,153, issued on Apr. 7, 1992, entitled "Snow Cycle Attachment For A Bicycle Frame". The bicycle was converted by removing both wheels and attaching a front ski attachment to the front of the frame and a drive disk to the rear of the frame. The drive disk was used to drive a double belt drive attachment which is mounted on the rear of the bicycle. This arrangement has been used successfully on packed snow but has not been successfully used in heavy snow.

SUMMARY OF THE PRESENT INVENTION

The present invention simplifies the construction of a snow cycle so that it operates as a single track bicycle as opposed to a double track system. The assembly of parts has been simplified by using a single belt drive which is mounted on a modified rear wheel with a single ski in the front to provide a single track vehicle.

One of the primary advantages of the present invention is the provision of a snow cycle which is operated like a bicycle.

Another advantage of the snow cycle according to the invention is the ability to use the same bicycle chain drive assembly for a single track snow cycle.

A further advantage of the snow cycle of the present invention is the use of a rear drive wheel having snow relief openings in the drive wheel which prevent build up of snow in the drive wheel.

Other principal features and advantages of the invention will become apparent to those skilled in the art upon review of the following drawings, the detailed description and the appended claims.

Figure 1:
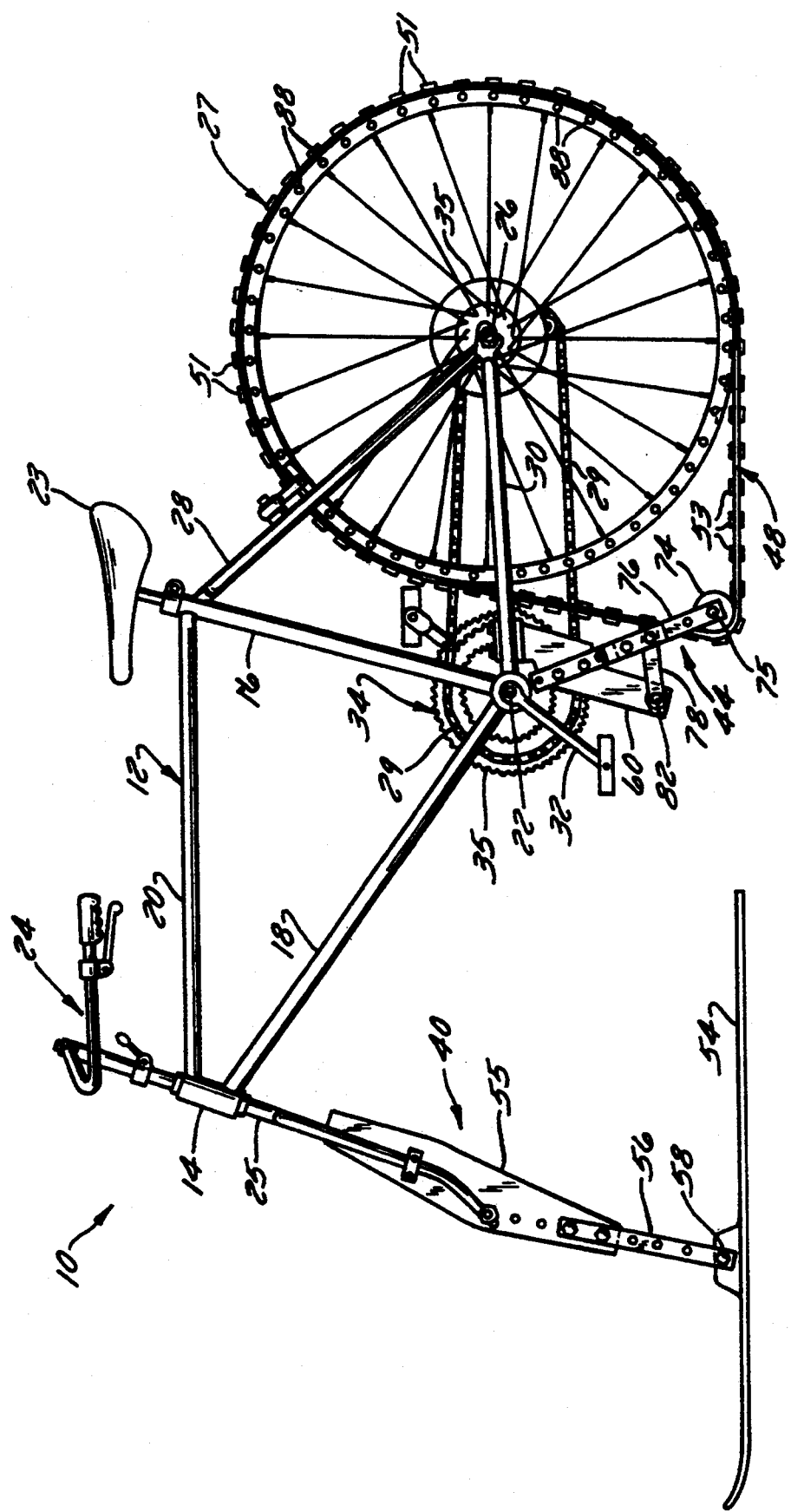
FIG. 1 is a side elevation view of the snow cycle showing the front ski and rear belt driven wheel.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The single track snow cycle 10 according to the present invention generally includes a frame 12 generally in the form of a parallelogram having a tubular steering support column 14, a tubular seat support column 16, a tubular pedal axle support column 18 and a tubular cross bar 20. The cross bar 20 is connected at one end to the steering column 14 and the other end to the seat support column 16. The axle support column 18 is connected at the upper end to the steering support column 14 and at the lower end to a pedal axle housing 22. The seat support column 16 is connected to the axle housing 22. A seat 23 is mounted in the seat column 16. A front fork 25 is mounted in the steering column 14. A handle bar assembly 24 is mounted on the upper end of the front fork assembly 25.

A single ski assembly 40 is mounted in the front fork 25. In this regard, the front ski attachment 40 includes a single ski 54 pivotally mounted on the end of vertical frame members 56 by a pin 58. Frame members 56 are secured to the front fork 25 by vertical frame member 55.

A rear fork 28 is connected to the support column 16 and to a rear axle housing 26. A pair of diverging tubular chain stays 30 are connected to the axle housing 22 and to the rear axle housing 26. A drive wheel 27 is mounted 2or rotary motion in axle housing 26. A pedal driven crank 32 is mounted for rotary motion in housing 22 to drive a multiple sprocket assembly 34. A multiple speed derailleur 35 is provided on the crank 32 as well as on the rear axle 26 for changing the chain 29 to vary the speed of the rear wheel 27.

Figure 2:
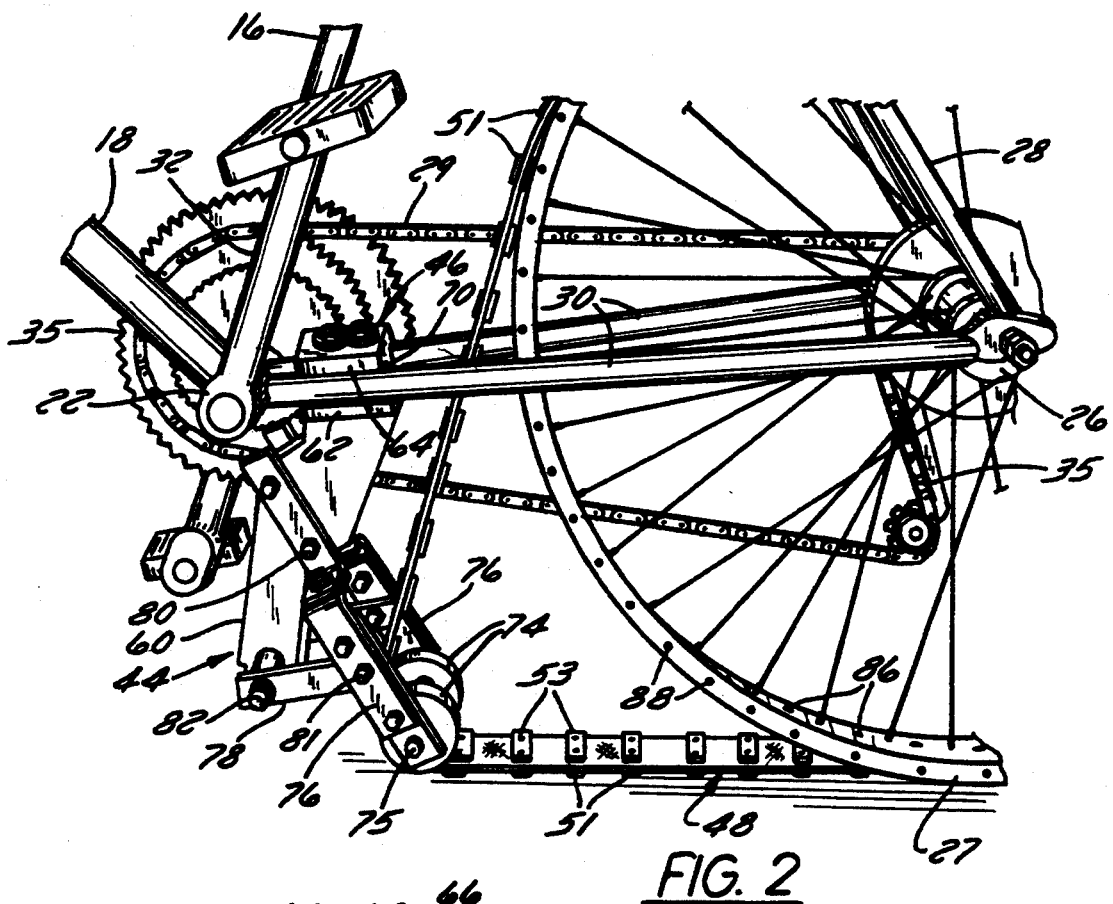
FIG. 2 is a perspective view of a drive portion of the snow cycle and the idler roller assembly.
Figure 3:
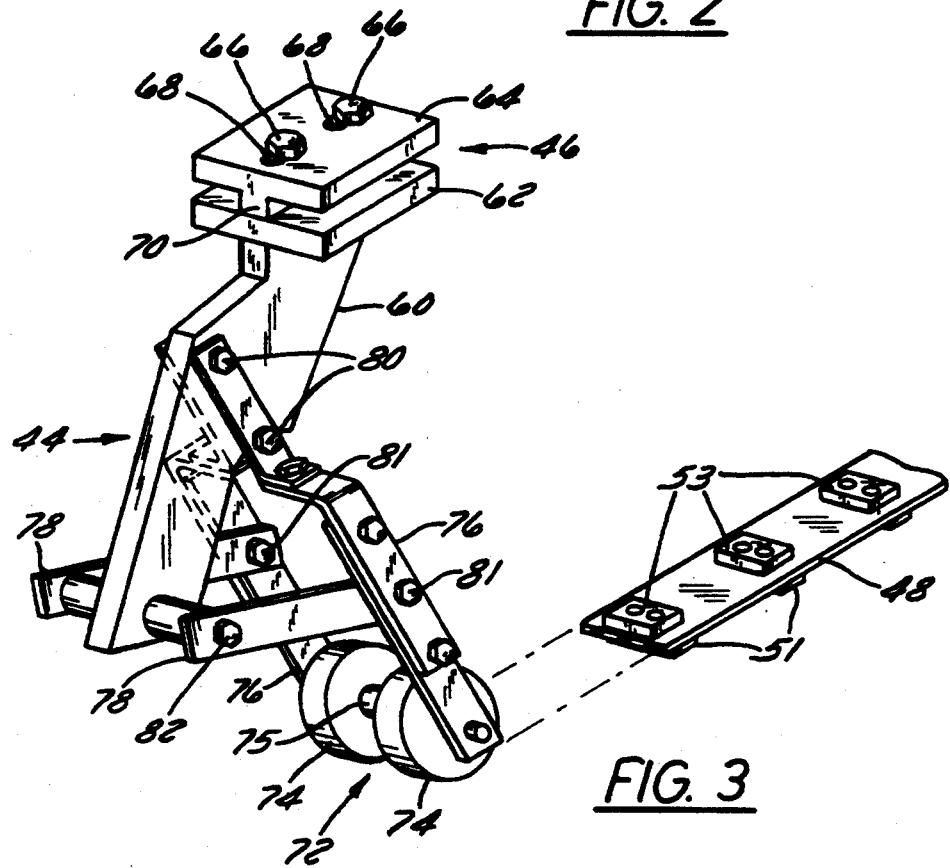
FIG. 3 is a perspective view of the idler assembly.
Figure 4:
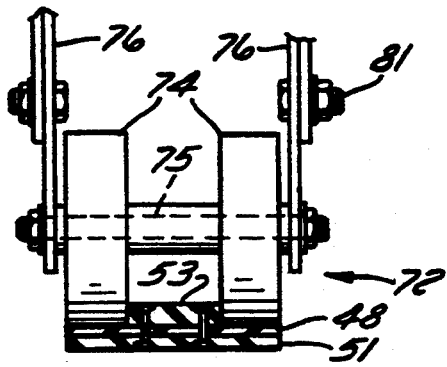
FIG. 4 is a cross section view of the idler rollers showing the drive belt aligned in the rollers.

In accordance with one aspect of the invention, a drive belt 48 is mounted on the outer periphery of the wheel 27 and around an idler roll assembly 44. The idler roll assembly 44 as shown in FIGS. 2, 3 and 4 includes a main support plate 60 which is secured to the chain stays 30 by means of a bracket assembly 46. The bracket assembly includes a plate 62 secured to support plate 60 and a plate 64 secured to plate 62 by screws 66 which are aligned in slots 68 in plate 64. The plate 64 includes a wedge shaped block 70 provided on the bottom of plate 64 which is aligned in the space between the chain stays 30. The plate 62 can be moved forward to tighten the belt 48 by loosening bolts 66 and sliding the block 62 forwardly. The bolts 66 are then retightened.

A guide roller assembly 72 is mounted on plate 60 by offset strips 76 which are connected to plate 60 by bolts 80. The strips 76 are stabilized by bars 78 which are connected to strips 76 by bolts 81 and to plate 60 by bolts 82. The bolts 80, 81 and 82 can also be used to adjust tension in the belt by providing slots in the plate 6, strips 76 and bars 78 to allow for movement of the guide rollers 74. The roller assembly 72 includes a pair of rollers 74 mounted in a spaced relation on shaft 75. The drive belt 48 is centered on the guide rollers 74 by aligning the drive plugs 53 mounted on belt 48 in the space between the rollers 74.

Figure 5:
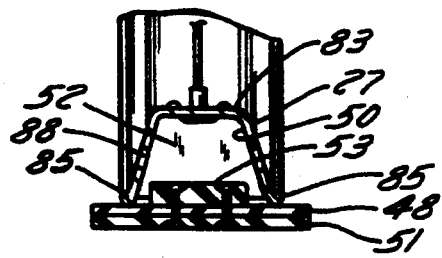
FIG. 5 is a showing the drive belt aligned in the wheel.
Figure 6A:
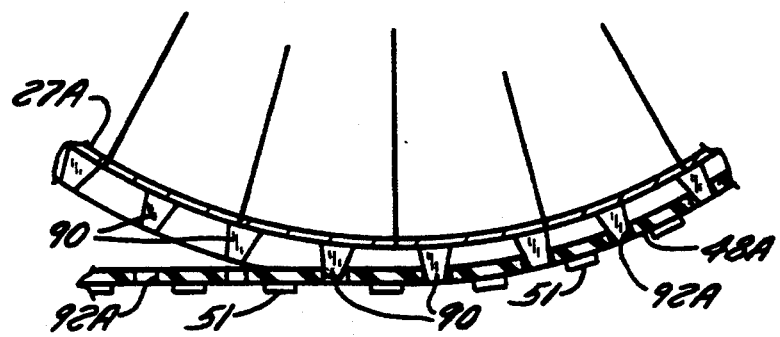
FIG. 6A is a view similar to FIG. 6 showing a modified belt drive arrangement.
Figure 6:
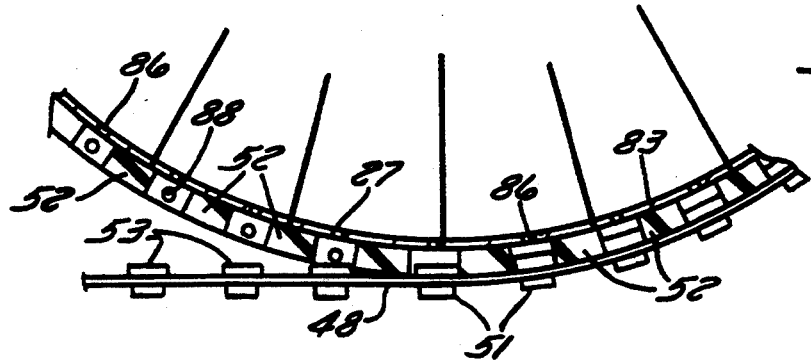
FIG. 6 is a cross section view of the drive belt aligned with the drive blocks on the wheel ring.

The rear wheel 27 includes a groove or channel 50, FIG. 5, around the outer perimeter thereof with equally spaced blocks 52 provided in the groove or channel of the wheel 27. The drive plugs 53 provided on the inside of drive belt 48 are equally spaced for alignment in the spaces between the blocks 52 in the wheel 27 as shown in FIG. 6. A corresponding number of lugs 51 are provided on the outside of belt 48 to drive the cycle in the snow.

Figure 5A:
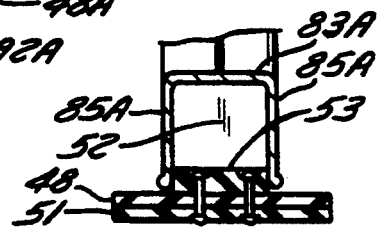
FIG. 5A is a view similar to FIG. 5 showing a modified rim arrangement.

The drive wheel 27 includes an inner ring 83 having a rim 85 on each side which extend radially outwardly from the ring 83. In the alternate embodiment of the rear wheel 27 as shown in FIG. 5A the wheel includes a ring 83A having rims 85A which form a square groove. The blocks 52 are equally spaced around the perimeter of ring 83. The belt 48 rides on the surface of blocks 52 with the drive plugs 53 aligned in the spaces between the blocks 52. Snow which accumulates in the spaces between the blocks 52 on the ring 83 is forced inwardly by the drive plugs 53. To relieve the pressure build up of snow in these spaces, holes 86 are provided in ring 83 between blocks 52 to allow for the discharge of snow outward from the wheel. Holes 88 may also be provided in the rims 85 between the blocks 52. With this arrangement, snow build up in the wheel is prevented. In an alternate embodiment as shown in FIG. 6A, the ring 27A is provided with a number of tapered cogs 9C, which matingly engage openings 92A in the belt 48A.

The snow cycle has been shown and described as a converted bicycle, however it could be constructed as a snow cycle with the idler assembly 44 permanently affixed to the chain stays 30.

Thus, it should be apparent that there has been provided in accordance with the present invention a snow cycle that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A snow cycle comprising a frame having a front fork and a rear fork,
   a single ski assembly mounted in said front fork,
   a handle assembly attached to the front fork,
   a rear wheel having an axle supported by said rear fork and a pair of spaced chain stays with a pedal drive assembly mounted on the frame and said chain stays and being operatively connected to drive said rear axle,
   an idler roller assembly rotatably mounted to fastening strips which are secured to a mounting plate which is aligned with and secured in the space between said chain stays such that said idler roller assembly is in a spaced relation to said rear wheel, and
   a drive belt mounted on the rear wheel and on the idler roller assembly, said belt includes a number of plugs on one side to operatively engage said wheel, whereby rotation of said drive assembly rotates the rear wheel to drive said belt, said wheel includes a ring and a pair of rims enclosing said belt and a number of drive blocks equally spaced around said ring to engage said plugs on said belt and a hole in said ring in the spaces between said blocks whereby snow accumulating between said blocks will be forced out through said holes by the plugs on said belt.

* * * * *